United States Patent
Cho et al.

(10) Patent No.: US 9,781,588 B2
(45) Date of Patent: Oct. 3, 2017

(54) METHOD AND APPARATUS FOR CONTROLLING WIRELESS LAN ACCESS POINT SELECTION OF USER EQUIPMENT IN WIRELESS COMMUNICATION SYSTEM

(71) Applicant: Samsung Electronics Co., Ltd., Gyeonggi-do (KR)

(72) Inventors: Songyean Cho, Seoul (KR); Hanna Lim, Seoul (KR); Sangsoo Jeong, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 123 days.

(21) Appl. No.: 14/159,931

(22) Filed: Jan. 21, 2014

(65) Prior Publication Data

US 2014/0204929 A1 Jul. 24, 2014

(30) Foreign Application Priority Data

Jan. 21, 2013 (KR) ........................ 10-2013-0006632

(51) Int. Cl.
*H04W 48/18* (2009.01)
*H04W 8/02* (2009.01)
(Continued)

(52) U.S. Cl.
CPC ............. *H04W 8/02* (2013.01); *H04W 48/16* (2013.01); *H04W 48/18* (2013.01); *H04W 48/02* (2013.01);
(Continued)

(58) Field of Classification Search
CPC ................. H04W 48/18; H04W 48/20; H04W 36/0036; H04W 72/0493; H04W 72/1257;
(Continued)

(56) References Cited

U.S. PATENT DOCUMENTS

2010/0296415 A1* 11/2010 Sachs ................... H04W 48/18 370/254
2011/0085498 A1* 4/2011 Oba ...................... H04W 48/18 370/328

(Continued)

FOREIGN PATENT DOCUMENTS

| KR | 100694218 | 3/2007 |
|---|---|---|
| WO | WO 2011/050835 | 5/2011 |
| WO | WO 2012/030156 | 3/2012 |

OTHER PUBLICATIONS

3GPP, "TR 23.865 v.0.4.0", Nov. 2012, pp. 1-18.*

(Continued)

*Primary Examiner* — Salvador E Rivas
(74) *Attorney, Agent, or Firm* — The Farrell Law Firm, P.C.

(57) ABSTRACT

Methods and apparatus are provided for controlling Wireless Local Area Network (WLAN) selection in a wireless communication system. Information on a limitation of managed objects, indicating whether to allow reception of a WLAN selection policy from a roaming network, is received. It is determined whether a User Equipment (UE) exists in the roaming network. It is determined whether to receive the WLAN selection policy from the roaming network based on the information on the limitation of the managed objects, when the UE exists in the roaming network. The WLAN selection policy is received from the roaming network, when it is determined that the WLAN selection policy is to be received from the roaming network. A WLAN is selected according to a policy set for the UE, when it is determined that the WLAN selection policy is not to be received from the roaming network.

8 Claims, 6 Drawing Sheets

(51) Int. Cl.
  *H04W 48/16* (2009.01)
  *H04W 72/12* (2009.01)
  *H04W 48/02* (2009.01)
  *H04W 48/20* (2009.01)
  *H04W 84/12* (2009.01)
  *H04W 88/06* (2009.01)

(52) U.S. Cl.
  CPC ........ *H04W 48/20* (2013.01); *H04W 72/1257* (2013.01); *H04W 84/12* (2013.01); *H04W 88/06* (2013.01)

(58) Field of Classification Search
  CPC ..... H04W 48/02; H04W 48/16; H04W 88/06; H04L 41/0893; H04L 12/244
  See application file for complete search history.

(56) References Cited

U.S. PATENT DOCUMENTS

2011/0223912 A1    9/2011  Nasielski et al.
2012/0309447 A1*  12/2012  Mustajarvi ............ H04W 48/18
                                                     455/524
2013/0003656 A1    1/2013  Cho et al.
2013/0150030 A1    6/2013  Lim et al.
2014/0023059 A1*   1/2014  Gupta .................. H04W 36/34
                                                     370/338

OTHER PUBLICATIONS

Motorola Mobility, "Combining I-WAN and ANDSF Selection Procedures", S2-124760, SA WG2 Meeting #94, Nov. 12-16, 2012.*
3rd Generation Partnership Project; Technical Specification Group Services and System Aspects; WLAN Network Selection for 3GPP Terminals; Stage 2, (Release 12), 3GPP TR 23.865 V0.4.0, Nov. 2012.
Motorola Mobility, "Combining I-WLAN and ANDSF Selection Procedures", S2-124760, SA WG2 Meeting #94, Nov. 12-16, 2012.
Huawei, "Analyze on Policy Conflict between USIM and ANDSF", C1-090146, 3GPP TSG CT WG1 Meeting #57, Feb. 9-19, 2009.

* cited by examiner

METHOD AND APPARATUS FOR CONTROLLING WIRELESS LAN ACCESS POINT SELECTION OF USER EQUIPMENT IN WIRELESS COMMUNICATION SYSTEM

PRIORITY

This application claims priority under 35 U.S.C. §119(a) to Korean Patent Application No. 10-2013-0006632, filed on Jan. 21, 2013, which is incorporated herein by reference.

BACKGROUND OF THE INVENTION

1. Field of the Invention

The present invention relates generally to a wireless communication system, and more particularly, to a method and an apparatus for controlling a wireless Local Area Network (LAN) access point of a user equipment.

2. Description of the Prior Art

Mobile communication systems have gradually expanded their services from voice services to high speed data services.

Traffic of a mobile communication network may be handled using a Wireless LAN (WLAN). Accordingly, a method of selecting a WLAN Access Point (AP) of a User Equipment (UE) is required.

Selection of the WLAN AP may correspond to an Interworking WLAN (I-WLAN) based on setting information of a Universal Subscriber Identity Module (USIM). Alternatively, selection of the WLAN AP may be based on information on managed objects received from an Access Network Discovery Service Function (ANDSF) server in the mobile communication network. As another alternative, selection of the WLAN AP may correspond to a hot spot solution based on information received through a query to the WLAN AP.

However, these alternatives may not satisfy demands of an operator, or related polices may be conflicted in a UE supporting all the three alternatives.

SUMMARY OF THE INVENTION

The present invention has been made to address at least the above problems and/or disadvantages and to provide at least the advantages described below. Accordingly, an aspect of the present invention provides a method and an apparatus for controlling WLAN AP selection of a UE which satisfy operator demands and also do not cause a conflict between related policies. In accordance with an aspect of the present invention, a method is provided of controlling WLAN selection by a UE in a wireless communication system. Information on a limitation of managed objects, indicating whether to allow reception of a WLAN selection policy from a roaming network, is received. It is determined whether the UE exists in the roaming network. It is determined whether to receive the WLAN selection policy from the roaming network based on the information on the limitation of the managed objects, when the UE exists in the roaming network. The WLAN selection policy is received from the roaming network, when it is determined that the WLAN selection policy is to be received from the roaming network. A WLAN is selected according to a policy set for the UE, when it is determined that the WLAN selection policy is not to be received from the roaming network.

In accordance with another aspect of the present invention, a UE is provided for controlling a WLAN selection in a wireless communication system. The UE includes a transceiver for communicating with a wireless communication system or a WLAN AP. The UE also includes a controller for receiving information on a limitation of managed objects indicating whether to allow reception of a WLAN selection policy from a roaming network, determining whether the UE exists in the roaming network, determining whether to receive the WLAN selection policy from the roaming network based on the information on the limitation of the managed objects when the UE exists in the roaming network, receiving the WLAN selection policy from the roaming network when it is determined that the WLAN selection policy is to be received from the roaming network, and selecting a WLAN according to a policy set for the UE when it is determined that the WLAN selection policy is not to be received from the roaming network.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
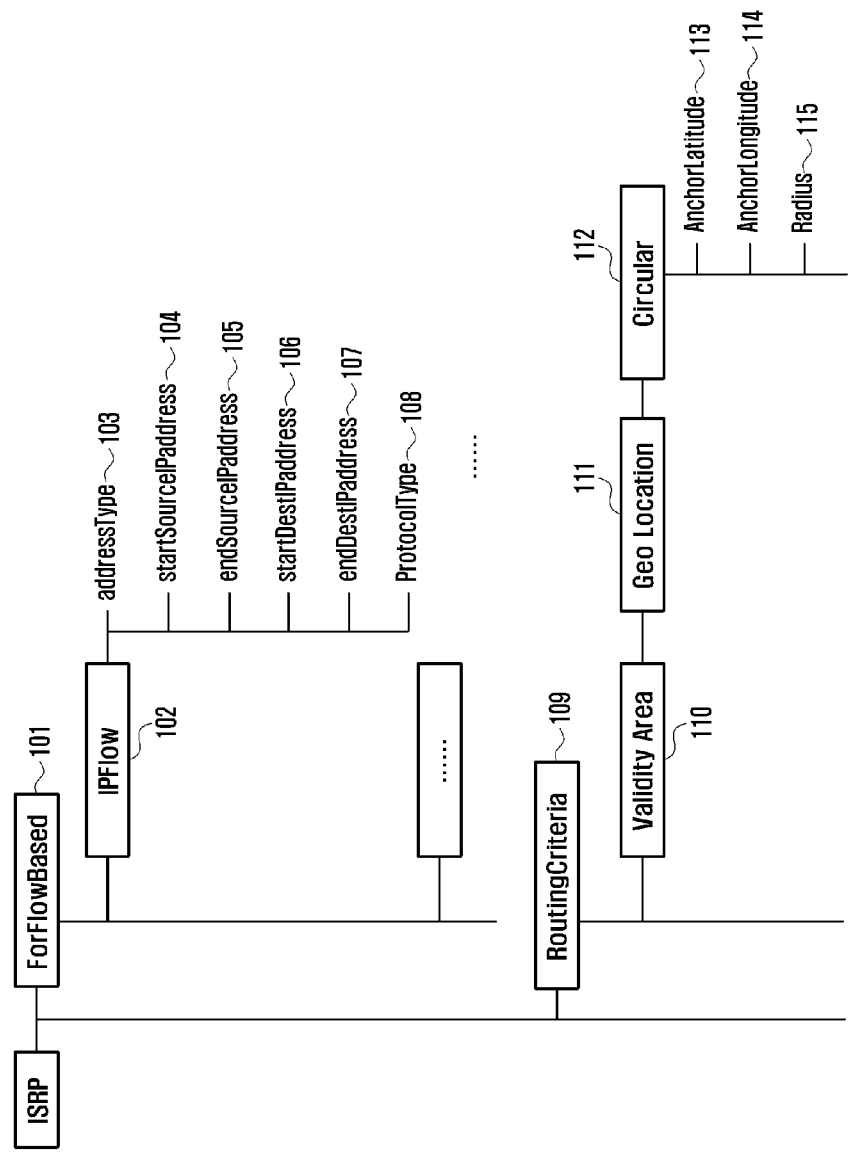
FIG. 1 is diagram illustrating a structure of an object managed by an ANDSF, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in art may be omitted to avoid obscuring the subject matter of the present invention.

As described above, three alternative WLAN AP selection procedures can be used when the UE desires to select a WLAN AP.

The I-WLAN procedure selects a WLAN AP by using an Extended Service Set ID (ESSID) priority list and a Public Land Mobile Network (PLMN) priority list stored in a USIM. Specifically, the UE transmits a query about supported PLMN IDs to the WLAN AP corresponding to the ESSID priority list stored in the USIM, and configures a list of pairs of the PLMN IDs and the ESSIDs. Further, the UE arranges the configured list by using the PLMN priority stored in the USIM, determines a priority of pairs of the PLMN IDs and the ESSIDs, and then selects a WLAN AP corresponding to a PLMN ID and an ESSID having a high priority.

As described above, since the I-WLAN procedure uses the information stored in the USIM, only information set by a home operator is used. Accordingly, the I-WLAN procedure is disadvantageous in that a function of selecting the WLAN AP according to a state of a roaming network cannot be provided when the UE uses the roaming network.

When the UE exists in the roaming network, an ANDSF procedure corresponding to the second selection procedure accesses an ANDSF server always existing within the roaming network to receive information on managed objects, and selects a WLAN AP based on the received information.

As described above, the ANDSF procedure has a problem in that requirements of the operator that requires the PLMN selection to always be controlled by the home operator cannot be satisfied.

A hot spot procedure corresponding to the third selection procedure is a type in which the UE receives a policy set by the WLAN operator through the WLAN AP to select the WLAN AP, and is controlled by the WLAN operator since WLAN AP selection of the UE is separated from the mobile communication network.

As described above, according to the hot spot selection procedure, when the WLAN operator AP and the WLAN AP installed by the mobile communication operator coexist, the mobile communication operator AP cannot be used, and thus, additional costs are charged to the WLAN operator.

Embodiments of the present invention described below provide a method of controlling WLAN AP selection of the UE in order to solve the above problems.

In an embodiment of the present invention, the home operator sets an application priority list of one or more WLAN AP selection procedures to the UE, and the UE performs the WLAN AP selection procedures according to the priority. A previously determined AP selection policy is characterized as not being influenced by a subsequent WLAN AP selection procedure.

The home operator sets an application priority list of one or more WLAN AP selection procedures to the UE. More specifically, for example, the home operator sets, to the USIM, an application priority list of WLAN AP selection procedures with respect to execution orders of the three selection procedures including: the I-WLAN procedure in which the home operator selects the WLAN AP by using the PLMN priority list and the ESSID priority list stored in the USIM of the UE; the ANDSF procedure in which the ANSDF sever selects the WLAN AP by using managed objects set to the UE; and the hot spot procedure in which the UE selects the WLAN AP based on policy information acquired from the WLAN AP by using a hot spot protocol.

The setting of the WLAN AP selection procedure application priority list in the UE may be performed based on Open Mobile Alliance Device Management (OMA-DM). The WLAN AP selection procedure application priority list may correspond to, for example, an order of I-WLAN>H-ANDSF>V-ANDSF>Hot Spot.

When information is acquired from the ANDSF server, a Visited ANDSF (V-ANDSF) corresponding to a case where the server is in the roaming network, and a Home ANDSF (H-ANDSF) corresponding to a case where the server is in the home network are distinguished and their priorities are set to a function execution priority list.

When a particular application starts or an IP flow having a particular address as a destination starts in the UE to which the WLAN AP selection procedure application priority list is set, automatic WLAN selection may be triggered.

When the WLAN selection is triggered, the UE first performs a procedure having a higher priority in the WLAN AP selection procedure application priority list in selecting the WLAN AP.

For conditions that have not been selected in the previously executed procedure, a procedure having a next priority in the WLAN selection procedure application priority list is executed. Thus, the AP selection policy determined in the previous step is not influenced by the WLAN AP selection procedure to be performed in the next step.

For example, it is assumed that the order of the WLAN AP selection procedure application priority list is set as I-WLAN>(H-ANDSF>V-ANDSF)>Hot Spot.

When the WLAN selection is triggered, the UE executes the I-WLAN procedure having the highest priority and then marks a selected ESSID and PLMN ID. Next, the procedure having a second highest priority based on the managed object set by the ANDSF server is executed. In executing the second procedure, since the policy (ESSID and PLMN ID) marked after being selected by the previous procedure is excluded from the WLAN selection policy, the ESSID and the PLMN ID are not selected. Specifically, the ESSID and the PLMN ID determined in the previous procedure are directly followed without any change.

For example, When the ANDSF server sets a validity area such that traffic triggering the WLAN selection can be used only in a predetermined position as illustrated in FIG. 1 (for example, a voice call using Wi-Fi), it is identified whether the UE is placed at the location and the location is marked when the WLAN selection based on the information set by the ANDSF server is performed. Similarly, the policy for the marked (determined) location is also not influenced by a next procedure.

Next, the UE uses only information other than the information (policy) determined by the previously executed procedure in the hot spot procedure corresponding to the procedure having a third highest priority. For example, the UE queries whether a candidate WLAN AP currently has a high load. When the load is high, the UE excludes the corresponding WLAN AP from candidates to be used.

The execution of the procedures may be repeated until all procedures included in the WLAN AP selection procedure application priority list are completely executed.

Referring FIG. 1, more detail descriptions for each parameter are as follows.

The ForFlowBased node 101 represents flow distribution container indicating data distribution among accesses based on flow description.

Occurrence: ZeroOrOne

Format: node

Access Types Get, Replace

Values: N/A

The IPFlow node 102 indicates the flow description for a particular flow distribution rule.

Occurrence: One

Format: node

Access Types Get, Replace

Values: N/A

The AddressType leaf 103 indicates the IP version of the addresses describing the IP flow.

Occurrence: ZeroOrOne

Format: chr

Access Types Get, Replace

Values: 'IPv4', 'IPv6'

The StartSourceIPaddress leaf 104 indicates the first IP source address of the IP address range of the IP flow description. The source address refers to the IP address of the data packets destined for the UE.
Occurrence: ZeroOrOne
Format: chr
Access Types Get, Replace
Values: <an IPv4 address>, <an IPv6 address>.

The EndSourceIPaddress leaf 105 indicates the last IP source address of the IP source address range of the IP flow description. The source address refers to the IP address of the data packets destined for the UE.
Occurrence: ZeroOrOne
Format: chr
Access Types Get, Replace
Values: <an IPv4 address>, <an IPv6 address>.

The StartDestIPaddress leaf 106 indicates the first IP destination address of the IP destination address range of the IP flow description. The IP destination address is any one of the IP addresses allocated to the UE that the UE uses as source address when generating IP traffic.
Occurrence: ZeroOrOne
Format: chr
Access Types Get, Replace
Values: <an IPv4 address>, <an IPv6 address>.

The EndDestIPaddress leaf 107 indicates the last IP destination address of the IP destination address range of the IP flow description. The IP destination address is any one of the IP addresses allocated to the UE that the UE uses as source address when generating IP traffic.
Occurrence: ZeroOrOne
Format: chr
Access Types Get, Replace
Values: <an IPv4 address>, <an IPv6 address>

The ProtocolType leaf 108 indicates the protocol type in a flow description.
Occurrence: ZeroOrOne
Format: int
Access Types Get, Replace
Values: <Protocol type>

The RoutingCriteria node 109 acts as a placeholder for validity conditions for a particular flow distribution rule.
Occurrence: ZeroOrOne
Format: node
Access Types Get, Replace
Values: N/A The ValidityArea node 110 acts as a placeholder for location conditions for a particular flow distribution rule.
Occurrence: ZeroOrOne
Format: node
Access Types Get, Replace
Values: N/A The Geo_Location node 111 acts as a placeholder for Geographical location descriptions for one ISMP rule.
Occurrence: ZeroOrOne
Format: node
Access Types Get, Replace
Values: N/A The Circular node acts 112 as a placeholder for circular areas location descriptions.
Occurrence: ZeroOrOne
Format: node
Access Types Get, Replace
Values: N/A AnchorLatitude leaf 113 indicates the latitude value of the center of the circular area.
Occurrence: One
Format: bin
Access Types Get, Replace
Values: <Latitude>

The AnchorLongitude leaf 114 indicates the longitude value of the center of the circular area.
Occurrence: One
Format: bin
Access Types: Get, Replace
Values: <Longitude>

The Radius leaf 115 indicates the radius value of the circular area.
Occurrence: One
Format: int
Access Types Get, Replace
Values: <Radius>

Figure 2:
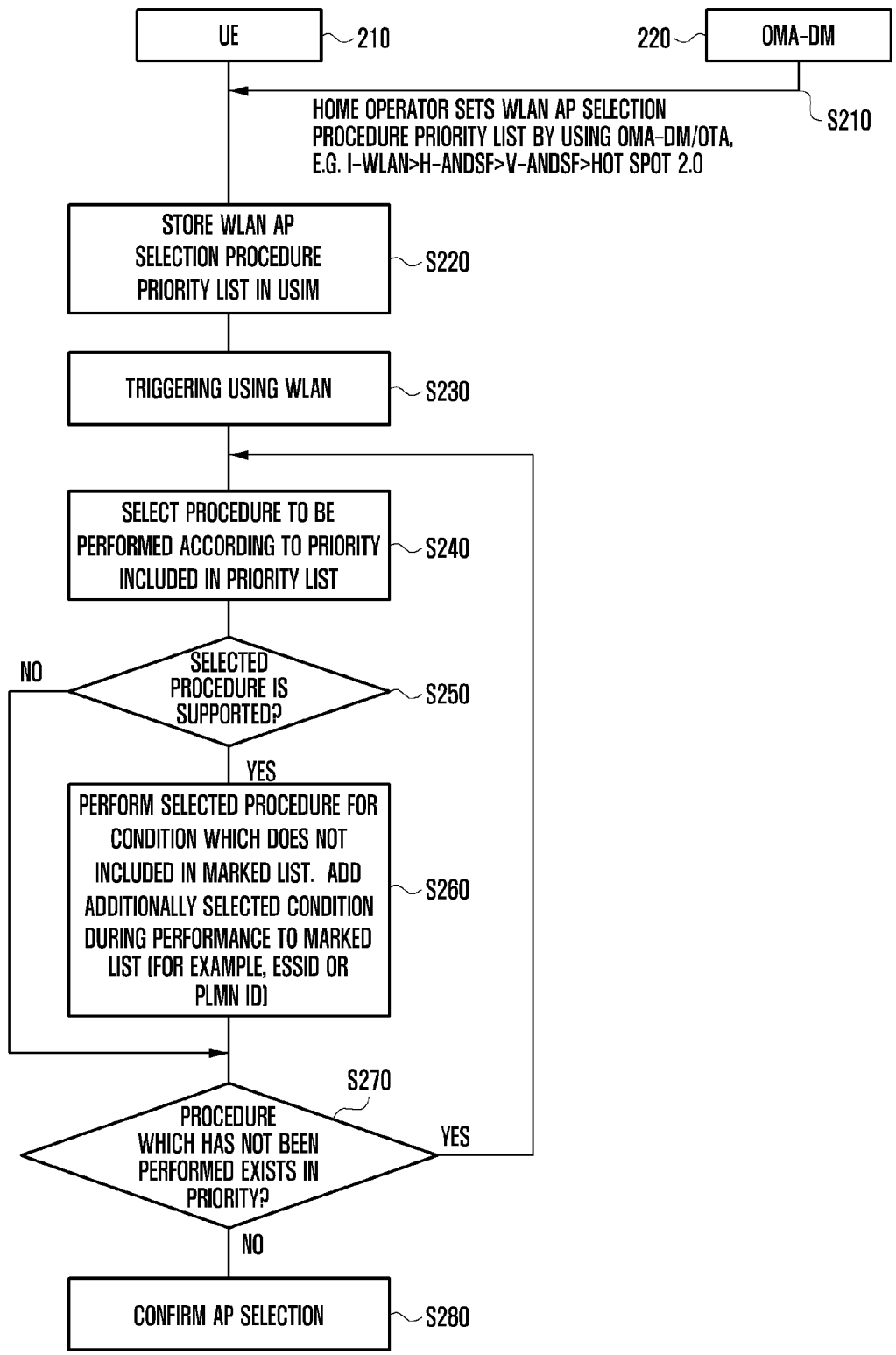
FIG. 2 is a flowchart illustrating an operation order of a UE, according to an embodiment of the present invention.

FIG. 2 is a flowchart illustrating an operation order of the UE, according to an embodiment of the present invention.

As described below, it is noted that, when the procedure included in the WLAN AP procedure selection application priority list is not implemented in the UE, the execution of the corresponding procedure may be omitted in this embodiment of the present invention.

Referring to FIG. 2, a UE 210 receives a procedure priority list for WLAN AP selection from an OMA-DM server 220, in step S210. In this embodiment of the present invention, the list may be referred to as a WLAN AP selection procedure application priority list.

The UE 210 stores the WLAN AP selection procedure application priority list in a memory, preferably in a USIM, in step S220.

The UE 210 detects WLAN triggering to use the WLAN, in step S230. The UE 210 selects a procedure to be performed at a present time point according to a priority set by the WLAN AP selection procedure application priority list, in step S240.

The UE 210 determines whether the UE 210 supports the selected procedure, in step S250. For example, although the UE 210 selects the I-WLAN procedure set to have the highest priority in the WLAN AP selection procedure application priority list, the UE 210 may not support the procedure. When the selected procedure is not supported, the UE 210 proceeds to step S270.

In contrast, when the UE 210 supports the selected procedure, the UE 210 executes the selected procedure only for conditions that are not included in the marked list, in step S260. Thus, the information (policy) determined according to a result of the execution of the previous procedure is directly followed without any change. The UE 210 adds a further selected condition (policy) during the currently executed procedure to the marked list. Based on the same principle, the updated marked list is not influenced by the later process.

The UE 210 determines whether there is a procedure has not been executed in the WLAN AP selection procedure application priority list, in step S270. When there is still a procedure which has not been executed, the UE 210 returns to step S240.

In contrast, when all procedures included in the WLAN AP selection procedure application priority list have been completely executed, the UE 210 proceeds to step S280 and confirms the AP selection. Specifically, the UE 210 selects the WLAN AP according to the determined policy.

Another embodiment of the present invention corresponds to a method in which the home operator may set the UE or the USIM of the UE to enable and/or disable the use of some or all information set by the V-ANDSF corresponding to a server of the roaming network. Alternatively, the home operator may set the UE or the USIM of the UE to use or to be prohibited from using all of the information set by the V-ANDSF server corresponding to the server of the roaming network. The UE performs the WLAN selection based on the setting by the home operator. Hereinafter, information set to be disabled may be referred to as immutable information.

In this embodiment of the present invention, while the home operator allows the use of information on a UE location (for example, GPS information or TAC/ECGI), which is a part of managed object information downloaded to the UE or the USIM of the UE from the V-ANDSF server, the home operator may prohibit the use of information related to the ESSID or the WLAN PLMN ID.

Figure 3:
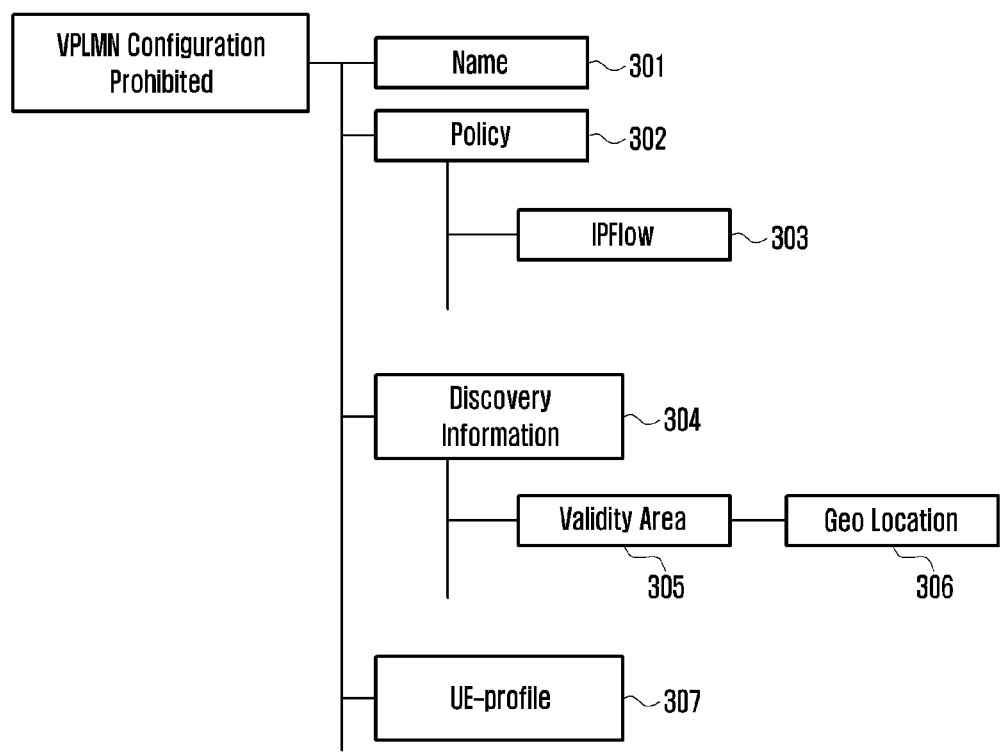
FIG. 3 is a diagram illustrating a managed object in which a home operator prohibits use of some of the information set by a V-AND SF server, according to an embodiment of the present invention.

When the home operator prohibits the use of some of the information set by the V-ANDSF server, the home operator may prohibit all of information related to a UE profile or only information expressing a validity area item as a geo location among discovery information as illustrated in FIG. 3. All information that has not been prohibited by the home operator is allowed to be used.

Referring FIG. 3, more detail descriptions for each parameter are as follows.

The Name leaf 301 is a name for the ANDSF MO settings.
Occurrence: ZeroOrOne
Format: chr
Access Types Get
Values: <User displayable name>

The Policy node 302 acts as a placeholder for ISMP information.
Occurrence: ZeroOrOne
Format: node
Access Types Get, Replace
Values: N/A An IP flow 303 is evaluated as matching if the IP flow matches at least one child node.
Occurrence: ZeroOrOne
Format: node
Access Types Get, Replace
Values: N/A The DiscoveryInformation node 304 acts as a placeholder for access network discovery information.
Occurrence: ZeroOrOne
Format: node
Access Types Get, Replace
Values: N/A The operator may provide information on available access networks through the ANDSF. The UE may use the information as an aid in discovering other access networks.

Figure 4:
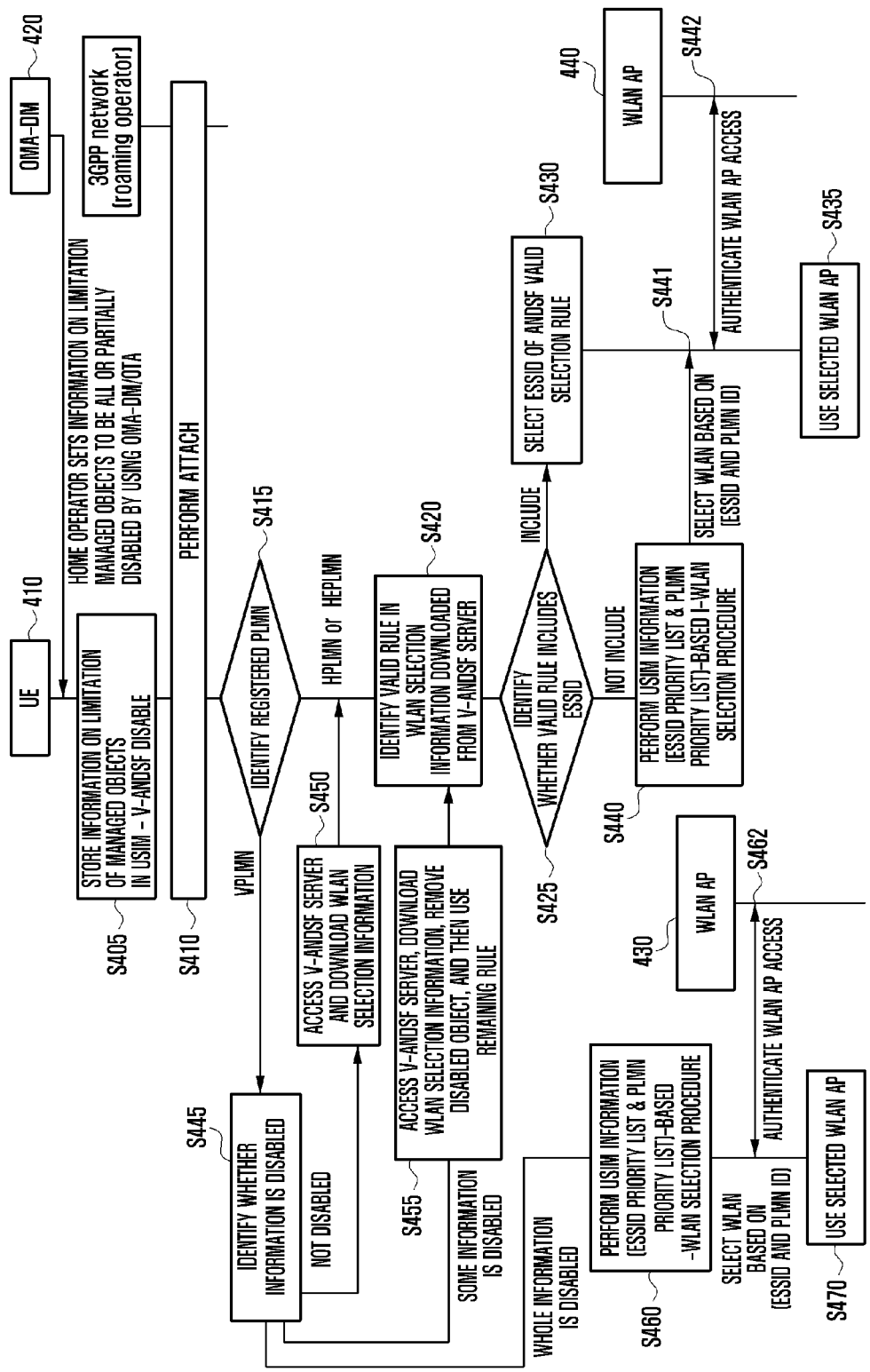
FIG. 4 is a flowchart illustrating an operation order of a UE, according to another embodiment of the present invention.

The ValidityArea node 305 acts as a placeholder for location conditions for a particular rule.
Occurrence: ZeroOrOne
Format: node
Access Types Get, Replace
Values: N/A The Geo_Location node 306 acts as a placeholder for Geographical location descriptions for one ISMP rule.
Occurrence: ZeroOrOne
Format: node
Access Types Get, Replace
Values: N/A The UE_Profile node 307 acts as a placeholder for describing the information characterizing the UE.
Occurrence: ZeroOrOne
Format: node
Access Types Get
Values: N/A Operation orders of the UE and the network, according to this embodiment of the present invention, are described with reference to FIG. 4.

A UE 410 receives information on a limitation of managed objects of the roaming network from an OMA-DM server 420 operated by the home operator. The information on the limitation of the managed objects of the roaming network may include information on the enabled state and/or the disabled state for the use of all or some of the information set by the V-ANDSF server corresponding to the ANDSF server of the roaming network. Alternatively, the information on the limitation of the managed objects may include a PLMN ID allowing the UE to download a WLAN selection policy from the roaming network. For example, when the PLMN ID identified in the roaming network is included in the information on the limitation of the managed objects, the UE may download the WLAN selection policy from the corresponding roaming network.

The UE 410 stores the information on the limitation of the managed objects of the roaming network, in step S405.

The UE 410 performs a procedure (i.e., an attach procedure) of accessing a network operated by the home operator, in step S410

The UE 410 determines whether the UE 410 currently exists in the roaming network or the home network, in step S415.

When the UE 410 exists in the home network, the UE 410 performs the WLAN AP selection procedure according to the managed object set by the ANDSF server of the home network. Specifically, the UE 410 identifies a valid rule set by the ANDSF server of the home network, in step S420. The UE 410 determines whether the valid rule includes the ESSID, in step S425. When the valid rule includes the ESSID, the UE 410 selects the ESSID of the ANDSF valid selection rule and performs an authentication procedure with the corresponding WLAN AP, in step S430. The UE 410 communicates with the authenticated WLAN AP, in step S435.

In contrast, when the valid rule does not include the ESSID in step S425, the UE 410 performs the I-WLAN procedure, in step S440. For this, the UE 410 selects a WLAN based on the ESSID and PLMN ID in step S441, and performs an authentication for WLAN AP access with WLAN AP 440 in step S442. Then, the UE 410 uses the selected WLAN AP for accessing the WLAN in step S435.

As described above, the I-WLAN procedure corresponds to a method of selecting the WLAN AP by using the ESSID priority list and the PLMN priority list stored in the USIM.

When the UE 410 exists in the roaming network in step S415, the UE 410 identifies the information on the limitation of the managed objects of the roaming network set to the UE 410 itself, in step S445. Specifically, the UE 410 identifies whether the use of the managed objects to be downloaded from the V-ANDSF server of the roaming network is all allowed, partially allowed, or prohibited. Alternatively, the UE may identify whether the use of the managed objects to be downloaded from the V-ANDSF server of the roaming network is allowed or prohibited. Thus, the UE may compare the information on the limitation of the managed objects and the PLMN ID operating the roaming network.

When the use of the managed objects is not prohibited, the UE 410 accesses the V-ANDSF server and downloads WLAN selection information from the corresponding server, in step S450. The WLAN selection information may be the managed object. Alternatively, the WLAN selection information may include information on a time point when the WLAN selection policy is applied. For example, the WLAN selection information may be set to allow the WLAN to be selected according to the WLAN selection information when congestion is generated in the network. Further, the WLAN selection information may include information on a WLAN AP to be selected. For example, when there are WLAN APs having a plurality of types, the WLAN selection information may include information on a type of the WLAN AP to be accessed. The UE then proceeds to step S420.

Returning to step S445, when the use of the managed objects is partially allowed, the UE 410 accesses the V-ANDSF server and downloads WLAN selection information from the corresponding server, in step S455. The WLAN selection information may be the managed object. Subsequently, the UE 410 performs the WLAN AP selection procedure by applying only the remaining objects which are allowed to be used except for the objects prohibited from being used among the downloaded managed objects. To this end, the UE 410 proceeds to step S420. Alternatively, when the home operator sets the use of the managed objects to be all allowed or prohibited, step S455 may be omitted.

Referring again to step S445, when the use of the managed objects of the roaming network is all prohibited, the UE 410 does not need to access the V-ANDSF server. Accordingly, the UE 410 proceeds to step S460 and performs the I-WLAN procedure by using the ESSID priority list and the PLMN priority list stored in the USIM. For this, the UE 410 selects a WLAN based on the ESSID and PLMN ID, and performs an authentication for WLAN AP access with WLAN AP 430 in step S462.

Then, the UE 410 uses the selected WLAN AP for accessing the WLAN in step S470.

When the UE, according to another embodiment of the present invention, transmits a request message for updating the managed objects to the ANDSF server, the UE also transmits information for determining whether the UE is a roaming UE or a home UE and information on whether the UE has an I-WLAN procedure capability.

The ANDSF server having received the information may identify whether the UE is the roaming UE and whether the UE has the I-WLAN procedure capability.

When the UE is not the roaming UE, the ANDSF server transmits the managed objects including all of the ESSID and WLAN PLMN selection related information to the UE. Then, the UE selects the WLAN AP by using the managed objects received from the ANDSF server.

In contrast, when the UE is the roaming UE, the ANDSF server (actually, V-ANDSF server) identifies an agreement relation between the UE and the home operator.

As a result of the identification, when the home operator for the UE allows the V-PLMN server to fully control the WLAN selection of the roaming UE, the ANDSF server of the roaming network transmits ANDSF managed objects to the UE without any change.

In contrast, as a result of the identification, when the home operator of the UE does not allow the WLAN selection of the VPLMN of the roaming UE, that is, ESSID and WLAN PLMN selection controls, the ANDSF server of the roaming network transmits managed objects except for the ESSID or the WLAN PLMN related information to the UE.

The UE, having received the managed objects, selects the WLAN AP by using the received managed objects.

When the ANDSF server identifies the UE as the UE existing in the home network but having the I-WLAN procedure capability, the ANDSF server deletes ESSID information from the managed objects and provides them to the UE to induce the UE to perform the I-WLAN procedure.

Further, even though the ANDSF server identifies the UE as the UE existing in the roaming network, and thus, is recommended not to set the ESSID or the WLAN PLMN related information, the ANDSF server additionally identifies the I-WLAN procedure capability and transmits managed objects including the ESSID or the WLAN PLMN related information to only the roaming UE that does not support the I-WLAN, thereby helping the UE select the WLAN AP.

Figure 5:
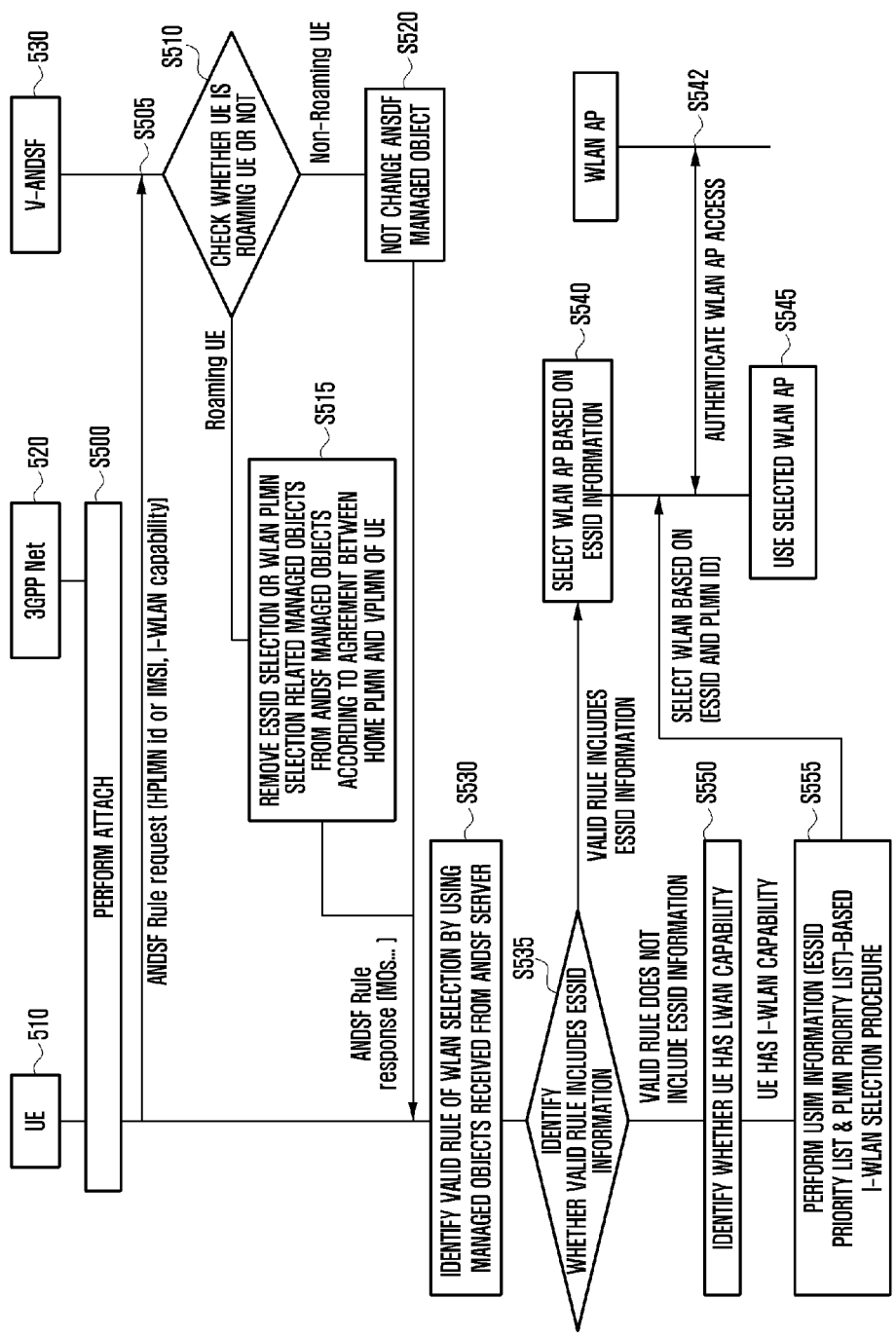
FIG. 5 is a flowchart illustrating an operation order of a UE, according to another embodiment of the present invention.

FIG. 5 is a flowchart illustrating an operation order of the UE and the network, according to another embodiment of the present invention.

A UE 510 performs a procedure (i.e., an attach procedure) of accessing a network 520, in step S500.

The UE 510 transmits an ANDSF rule request message to an ANDSF server 530, in step S505. The request message may be an initial request for making a request for transmitting the ANDSF rule, or an update request for making a request for updating the ANDSF rule. According to an embodiment of the present invention, the request message includes information for determining whether the UE is a roaming UE or a home UE and information on whether the UE has an I-WLAN procedure capability.

The ANDSF server 530 may determine whether the UE is the roaming UE based on the received request message, in step S510.

When the UE is not the roaming UE, that is, when the UE is the home UE, the ANDSF server 530 does not change managed objects and transmits an ANDSF rule response message including the managed objects to the UE 510, in step S520.

In contrast, when the UE is the roaming UE, the ANDSF server 530 removes ESSID selection or WLAN PLMN selection related managed objects from the ANDSF managed objects according to an agreement (contract) relation between the UE and the home operator, in step S515. Further, the ANDSF server 530 transmits the ANDSF rule response message including the changed managed objects to the UE 510.

The UE 510 identifies a valid rule of the WLAN selection by using the managed objects received from the ANDSF server 530, in step S530. The UE 510 determines whether the valid rule includes ESSID information, in step S535.

When the valid rule includes the ESSID information, the UE 510 performs the WLAN AP selection procedure based on the ESSID information, in step S540, and uses the selected WLAN AP after the selection, in step S545. Also, the UE 510 may performs an authentication procedure for WLAN AP access in step S542.

In contrast, when the valid rule does not include the ESSID information, the UE 510 identifies the I-WLAN procedure capability of the UE, in step S550. When the UE 510 has the I-WLAN procedure capability, the UE 510 performs the I-WLAN procedure by using the ESSID priority list and the PLMN priority list stored in the USIM, in step S555.

Figure 6:
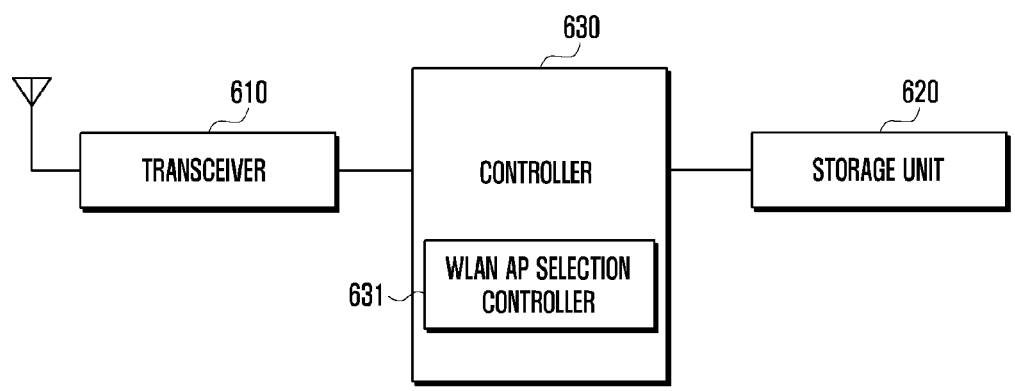
FIG. 6 is a block diagram illustrating an internal structure of a UE, according to an embodiment of the present invention.

FIG. 6 is a block diagram illustrating an internal structure of the UE, according to an embodiment of the present invention. As illustrated in FIG. 6, the UE includes a transceiver 610, a storage unit 620, and a controller 630.

The transceiver 610 may transmit/receive a signal to/from a random node located at the wireless communication network, for example, a base station, an ANDSF server operated by the home operator, or an OMA-DM server.

The storage unit 620 may store various types of programs required for the operations of the UE. According to an embodiment of the present invention, the storage unit 620 may store information on the policy set by the home operator or the operator of the roaming network for the WLAN AP selection described in each of the embodiments of the present invention. Specifically, the information may include the WLAN AP selection procedure application priority list and the information on the limitation of the managed objects.

The controller 630 controls a signal flow between blocks to allow the UE to operate, according to an embodiment of the present invention. Thus, the controller 630 includes a WLAN AP selection controller 631. The WLAN AP selection controller 631 performs a function, according to each of the embodiments of the present invention.

The WLAN AP selection controller 631, according to an embodiment of the present invention, receives and sets a WLAN AP selection procedure application priority list including application priority information of one or more WLAN AP selection procedures. Further, the WLAN AP selection controller 631 selects a WLAN AP selection procedure to be performed according to the WLAN AP selection procedure application priority list, when WLAN AP selection procedure trigger is detected. In addition, the WLAN AP selection controller 631 determines a policy of the WLAN AP selection by performing the selected WLAN AP selection procedure, but provides control such that a policy determined in a step of performing the previous WLAN AP selection procedure is not changed in a step of performing the next WLAN AP selection procedure.

The WLAN AP selection controller 631, according to another embodiment of the present invention, receives and stores the information on the limitation of the managed objects of the roaming network. Further, the WLAN AP selection controller 631 determines whether the UE exists in the roaming network or the home network based on the location information of the UE, and provides control such that the WLAN AP selection procedure is performed according to the stored information on the limitation of the managed objects of the roaming network when the UE existing in the roaming network. The information on the limitation of the managed objects of the roaming network may include information on an enabled state or a disabled state for the use of the managed objects set by the V-ANDSF of the roaming network.

The WLAN AP selection controller 630, according to another embodiment of the present invention, transmits a managed object request message including information on whether the UE is the roaming UE and information on whether the UE has the I-WLAN procedure capability to the ANDSF server. Further, the WLAN AP selection controller 631 receives the managed objects transmitted from the ANDSF server, and provides control such that the WLAN AP selection procedure is performed according to the received managed objects.

Although it has been described that the controller 630 and the WLAN AP selection controller 631 are separate blocks, the present invention is not limited thereto. For example, it is noted that the functions performed by the WLAN AP selection controller 631 may be performed by the controller 630.

According to embodiments of the present invention, the UE can select a WLAN AP to satisfy operator demands, while not causing a conflict between related policies.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method of controlling wireless local area network (WLAN) selection by a user equipment (UE) in a wireless communication system, the method comprising:
    receiving, from a server associated with a home operator of the UE, a priority list of one or more extended service set IDs (ESSIDs) of one or more WLANs, a priority list of one or more public land mobile network identifications (PLMN IDs) of one or more networks, and information indicating from which PLMN IDs to allow reception of a WLAN selection policy when the UE exists in the network having the PLMN ID as a roaming network, and;
    determining whether the UE exists in a roaming network;
    determining whether the roaming network has one of the PLMN IDs from which reception of a WLAN selection policy is allowed, if the UE exists in the roaming network;
    connecting to a server of the roaming network to receive the WLAN selection policy and select a WLAN based on the received WLAN selection policy, if the reception of the WLAN selection policy from the roaming network is allowed; and
    selecting the WLAN based on the priority list of ESSIDs and the priority list of PLMNs received from the home operator of the UE, if the reception of the WLAN selection policy from the roaming network is not allowed.

2. The method of claim 1, wherein the UE also receives information on a limitation of managed objects from an open mobile alliance device management (OMA-DM) server, which the UE has joined.

3. The method of claim 1, wherein the WLAN selection policy comprises information on a time point if the WLAN selection policy is applied.

4. The method of claim 1, wherein the WLAN selection policy comprises information on a WLAN access point (AP) to be selected by the UE.

5. A user equipment (UE) for controlling wireless local area Network (WLAN) selection in a wireless communication system, the UE comprising:
    a transceiver for communicating with a wireless communication system or a WLAN access point (AP); and
    a controller for:
        receiving, in a home network from a server associated with a home operator of the UE, a priority list of one or more extended service set IDs (ESSIDs) of one or more WLANs, a priority list of one or more public land mobile network identifications (PLMN IDs) of one or more networks, and information indicating from which PLMN IDs to allow reception of a WLAN selection policy when the UE exists in the network having the PLMN ID as a roaming network, and;
        determining whether the UE exists in the roaming network;
        determining whether the roaming network has one of the PLMN IDs from which reception of a WLAN selection policy is allowed, if the UE exists in the roaming network;
        connecting to a server of the roaming network to receive the WLAN selection policy and select a WLAN based on the received WLAN selection policy, if the reception of the WLAN selection policy from the roaming network is allowed; and
        selecting the WLAN based on the priority list of ESSIDs and the priority list of PLMNs received from the home operator of the UE, if the reception of the WLAN selection policy from the roaming network is not allowed.

6. The UE of claim 5, wherein the controller further controls to receive information on a limitation of the managed objects from an open mobile alliance device management (OMA-DM) server, which the UE has joined.

7. The UE of claim 5, wherein the WLAN selection policy comprises information on a time point if the WLAN selection policy is applied.

8. The UE of claim 5, wherein the WLAN selection policy comprises information on a WLAN AP to be selected by the UE.

* * * * *